(12) United States Patent
Oboza et al.

(10) Patent No.: US 7,607,346 B1
(45) Date of Patent: Oct. 27, 2009

(54) TIRE PRESSURE INDICATOR

(76) Inventors: Andrzej Z. Oboza, 11743 Pinedale Rd., Moorpark, CA (US) 93021; Julian Marciniec, 67 E. Orange Grove Ave., Burbank, CA (US) 91501

( * ) Notice: Subject to any disclaimer, the term of this patent is extended or adjusted under 35 U.S.C. 154(b) by 0 days.

(21) Appl. No.: 12/156,815

(22) Filed: Jun. 6, 2008

Related U.S. Application Data

(63) Continuation-in-part of application No. 11/306,783, filed on Jan. 11, 2006, now abandoned.

(51) Int. Cl.
*B60C 23/02* (2006.01)
(52) U.S. Cl. ..................................... 73/146.8
(58) Field of Classification Search ........ 73/146–146.8; 340/442, 445
See application file for complete search history.

(56) References Cited

U.S. PATENT DOCUMENTS

| | | | |
|---|---|---|---|
| 3,453,590 A | 7/1969 | Burgess | |
| 4,737,760 A | 4/1988 | Huang et al. | |
| 4,814,745 A | 3/1989 | Wang | |
| 4,954,806 A | 9/1990 | Huang | |
| 5,289,161 A | 2/1994 | Huang | |
| 6,034,596 A | 3/2000 | Smith | |
| 6,525,655 B2 | 2/2003 | Huang | |
| 6,588,264 B1 * | 7/2003 | Johnson | 73/146.8 |
| 6,588,265 B1 * | 7/2003 | Roberson | 73/146.8 |
| 6,647,771 B2 * | 11/2003 | Burns | 73/146 |
| 6,722,193 B1 * | 4/2004 | Conway | 73/146.8 |
| 7,019,629 B2 * | 3/2006 | Kraft | 340/442 |
| 7,196,616 B2 * | 3/2007 | Huang | 340/442 |
| 7,251,994 B2 * | 8/2007 | Maldonado et al. | 73/146.8 |
| 2004/0025581 A1 * | 2/2004 | Miller | 73/146 |
| 2005/0072349 A1 * | 4/2005 | Perlin et al. | 116/34 B |
| 2006/0059983 A1 * | 3/2006 | Maldonado et al. | 73/146 |

* cited by examiner

*Primary Examiner*—Andre J Allen
(74) *Attorney, Agent, or Firm*—Albert O. Cota

(57) ABSTRACT

A tire pressure indicator (TPI) (10) that provides a method by which the air pressure in vehicle tires can be easily and reliably checked to determine if the tires are optimally inflated. The TPI (10) is comprised of a valve core (12) that replaces a conventional tire-valve core that is inserted into a vehicle tire stem (170). The valve core (12) includes a diaphragm (64) that controls the vertical displacement of a plunger shaft (80) that controls the contact position of a switch (S1). From the switch (S1) a high or a low tire-pressure signal is transmitted to a tire pressure monitoring unit (160), from where an individual can observe and correct the tire pressure. The TPI (10) features a structure and a method by which false tire pressure signals caused by changes in ambient temperature and normal tire temperature fluctuations are eliminated.

20 Claims, 7 Drawing Sheets

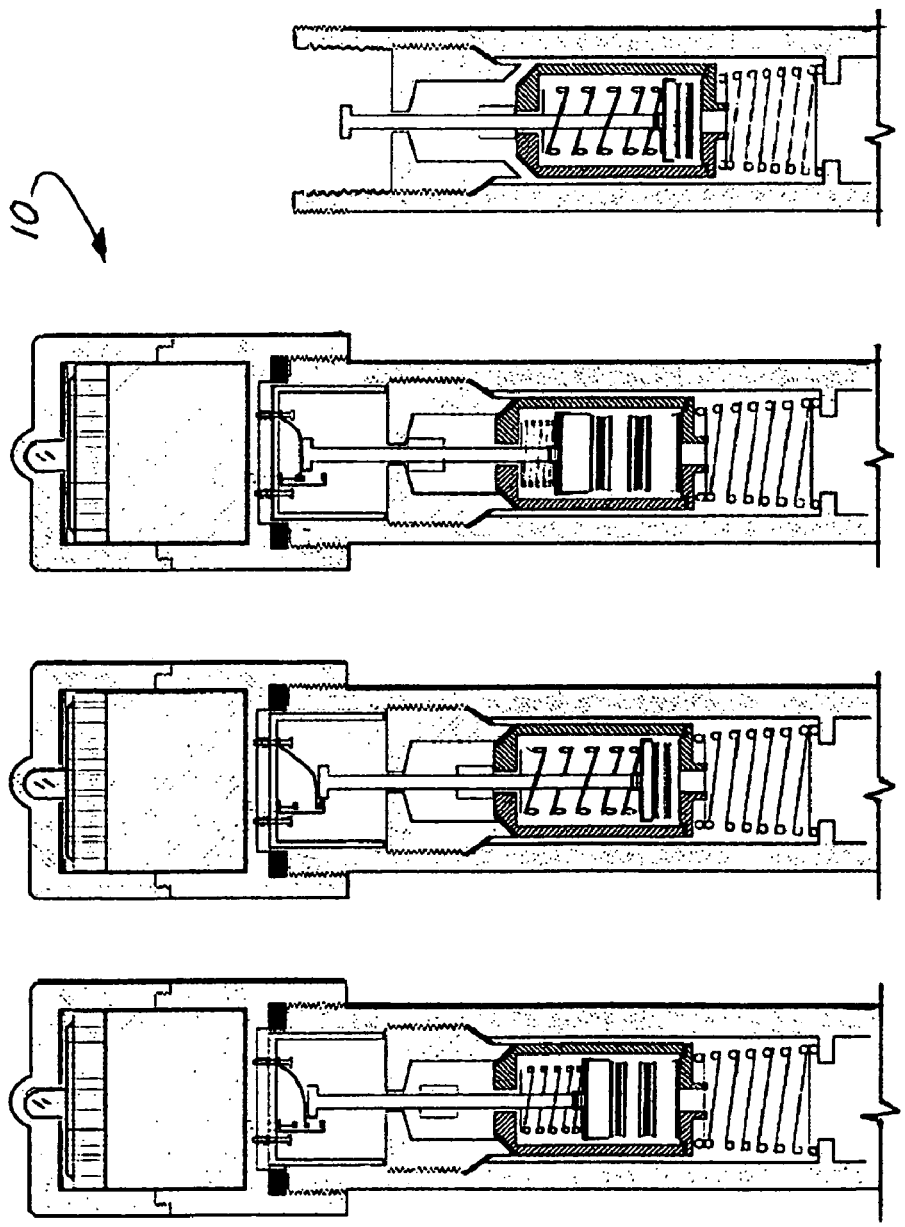

TIRE PRESSURE INDICATOR

This application is a continuation-in-part (C.I.P.) of U.S. application Ser. No. 11/306,783 filed Jan. 11, 2006 now abandoned.

TECHNICAL FIELD

The invention generally pertains to tire pressure indicators and more particularly to a high and low vehicle tire pressure indicator that compensates for temperature fluctuations when determining and transmitting the vehicle tire pressure to a remotely located temperature monitoring.

BACKGROUND ART

The use of automobiles and other vehicles for personal transportation, commerce and service has become firmly established. Most vehicles utilize inflatable tires as a significant element of the vehicle's design and function.

In the same way that a vehicle's engine or transmission must receive periodic maintenance, tires also must be regularly serviced to maintain optimal performance. Other than replacing tires when they become worn, maintaining the correct air pressure within a tire is the most important aspect of tire maintenance.

When the air pressure within a tire is either too high or too low, the tire cannot perform at its optimal level. Incorrect air pressure within a tire can also present a safety hazard, will lead to excessive and more frequent tire wear, and will require greater fuel consumption by the vehicle. Therefore, it is imperative that vehicle tire pressure be maintained at the proper level.

One of the most significant, yet often overlooked, contributors to tire air pressure fluctuations is temperature. It is often difficult to accurately determine if a tire pressure is correct when the temperature is effecting the pressure.

There are several factors that can generate temperature fluctuations on or around tires. These factors include: the environmental conditions, the tire condition, tires that have been driven for extended periods of time, vehicle brake components emitting heat, the weight of the vehicle and the condition of the road.

There are prior art devices and systems available for determining whether the air pressure within a tire is correct. Some examples are a simple hand-held gauge that is manually inserted into the tire valve, to complex electronic systems with sensors that operate in conjunction with a modern vehicle's computer diagnostic system. Unfortunately, most of these devices and systems do not consider temperature fluctuations when determining whether the air pressure is correct. It is obvious that a tire air pressure indicator that does recognize temperature fluctuations would be extremely beneficial.

A search of the prior art did not disclose any patents or industry literature that read directly on the claims of the instant invention. However, the following U.S. patents are considered related:

| U.S. PAT. NO. | INVENTOR | ISSUED |
| --- | --- | --- |
| 6,525,655 | Huang | 25 Feb. 2003 |
| 6,034,596 | Smith | 7 Mar. 2000 |
| 4,954,806 | Huang | 4 Sep. 1990 |
| 4,814,745 | Wang | 21 Mar. 1989 |
| 3,453,590 | Burgess | 1 Jul. 1969 |

The U.S. Pat. No. 6,525,655 discloses a diaphragm-type tire pressure indictor that is fastened to the air nozzle of a vehicle tire for indicating a low tire pressure. A flexible diaphragm is mounted in a receiving chamber in the casing of the tire pressure indicator. A spring-connected push rod is connected to the flexible diaphragm that indicates the status of the tire pressure of the vehicle tire.

The U.S. Pat. No. 6,034,596 discloses a system for displaying dynamic readings of a motor vehicle's tire pressure, temperature and tire ride efficiency. The system comprises individual integrated units that are attached to each valve stem. Each unit comprises a pressure sensor and a temperature sensor coupled to a microcontroller which activates a transmitter/receiver set with a measured signal. The signal is received by a transmitter/receiver set in a passenger compartment mounted display.

The U.S. Pat. No. 4,954,806 discloses a warning device for detecting inadequate tire air pressure. The device comprises an outer shell which includes all assembly members and can be screwed into a tire's air valve. A needle plate which operates and opens the tire valves, a resilient hook undertakes a compression from the tire air pressure; a switch bar moves along with the resilient hook under compression; and a PC board with the warning sounds and lights circuit. As screwedly mounted to each tire valve of a vehicle's, this device because of function of the operating needle plate can allow air communication and thus make the air pressure in the resilient hook outer front area equal to tire's regulated air pressure, and that acts resilient hook to move the switch bar which then causes the warning sounds and lights circuit to be open circuit. When the tire air pressure of the tire valve falls below a predetermined standard or electrical generates warning sounds and lights.

The U.S. Pat. No. 4,814,745 discloses a combined cap and signal device that is attached to a tire after the tire is inflated. The device includes an electric alarming unit mounted in a cap-like casing with an adapter that is connected to an inflating valve of the tire. A resilient disc is disposed in the adapter that is forced by air so that the disc causes the alarming unit to open when the tire is not deflated.

The U.S. Pat. No. 3,453,590 discloses a system for detecting the presence of low pressure in a vehicle tire. A signal generator in the form of a turbine is provided along with a low pressure valve in a tire valve stem. When the tire pressure falls below a certain value the low pressure valve opens and the escaping air drives the turbine. The turbine either generates a sound wave or drives an electromagnetic generator to generate a high frequency induction field. A detector on the vehicle senses the presence of such a signal, and in turn activates an alarm to inform the driver of the low pressure condition.

For background purposes and as indicative of the art to which the invention is related reference may be made to the following remaining patents located in the search.

| U.S. PAT. NO. | INVENTOR | ISSUED |
| --- | --- | --- |
| 5,289,161 | Huang | 22 Feb. 1994 |
| 4,954,806 | Huang | 4 Sep. 1990 |
| 4,737,760 | Huang, et al | 12 Apr. 1988 |

DISCLOSURE OF THE INVENTION

The tire pressure indicator (TPI) disclosed herein is designed to provide a quick and accurate method for determining if the tires on a wide range of vehicles are properly inflated. By maintaining a tire pressure that is recommended by the manufacturer of the vehicle, safety, tire wear and fuel consumption is improved.

In its basic design configuration the TPI is comprised of a valve core that is designed to be inserted into a vacated vehicle tire stem. The valve core is further comprised of a valve plug, a plunger housing and a plunger shaft. The valve plug has an upward-extending cavity that terminates with an upper surface having a plug shaft bore, a valve stem interfacing surface and a lower surface.

The plunger housing includes an upper surface that interfaces with the lower surface of the valve plug, a lower surface, a diaphragm, an upper spring, a plunger shaft bore and a compression spring. The upper surface of the housing interfaces with the lower surface of the valve plug and the plunger shaft bore is in alignment with the plug shaft bore located on the valve plug. Attach to the lower surface of the plunger housing is a housing base having an upper surface, a lower surface and an air-passage bore.

The diaphragm has an upper surface and a lower surface with the lower surface interfaces with the upper surface of the housing base. The upper spring is located between the upper surface of the diaphragm and the upper surface of the plunger housing. The plunger shaft extends through the plug shaft bore and through the plunger shaft bore. The plunger shaft also has an upper end and a lower end, with the lower end interfacing with the upper surface of the diaphragm. Located between the lower surface of the housing base and the spring retainer located on the vehicle tire stem is a compressive element.

Attached to the upper end of the vehicle valve stem is a control cap that also interfaces with the inventive valve plug. The control cap is dimensioned to enclose a tire-pressure transmitting unit (TPTU). The TPTU has means for receiving and processing a high pressure signal and a low pressure signal that are applied from a switch that is controlled by the vertical displacement of the plunger shaft. The high or the low pressure signals are transmitted by the TPTU to a remotely located tire-pressure monitoring unit (TPMU).

The TPTU has means for producing either a high pressure signal that illuminates an LED (DS3) in a first color or a low pressure signal that illuminates an LED (DS4) in a second color. The LEDS visually indicate if a tire is under inflated or over inflated.

The TPI features means for preventing the TPTU from transmitting false high or low tire pressure signals. These signals result from changes in the ambient temperature and/or normal tire temperature fluctuations that vary from a base temperature which corresponds to a preset tire pressure that is recommended by the tire manufacturer.

In view of the above disclosure, the primary object of the invention is to provide an easily attached TPI that provides a quick and reliable method for determining if a vehicle's tires are properly inflated.

In addition to the primary object of the invention it is also an object of the invention to produce a tire pressure indicator that:

Allows the inventive valve plug to be easily inserted into a vacated vehicle tire stem,
prevents false high and low pressure readings that are caused by changes in the ambient temperature and/or normal tire temperature fluctuations,
can be adapted to function with various tire sizes,
is reliable and requires no maintenance, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 6A is a cross-sectional view of the TPI shown with the pole of the switch S1 in a normal tire pressure position.

FIG. 6B is a cross-sectional view of the TPI shown with the pole of the switch S1 in a low pressure position.

FIG. 6C is a cross-sectional view of the TPI shown with the pole of the switch S1 in a high pressure position.

FIG. 7 is a cross-sectional view of the TPI shown with the control cap removed to allow air to be inserted or removed from the valve core.

BEST MODE FOR CARRYING OUT THE INVENTION

Figure 1:
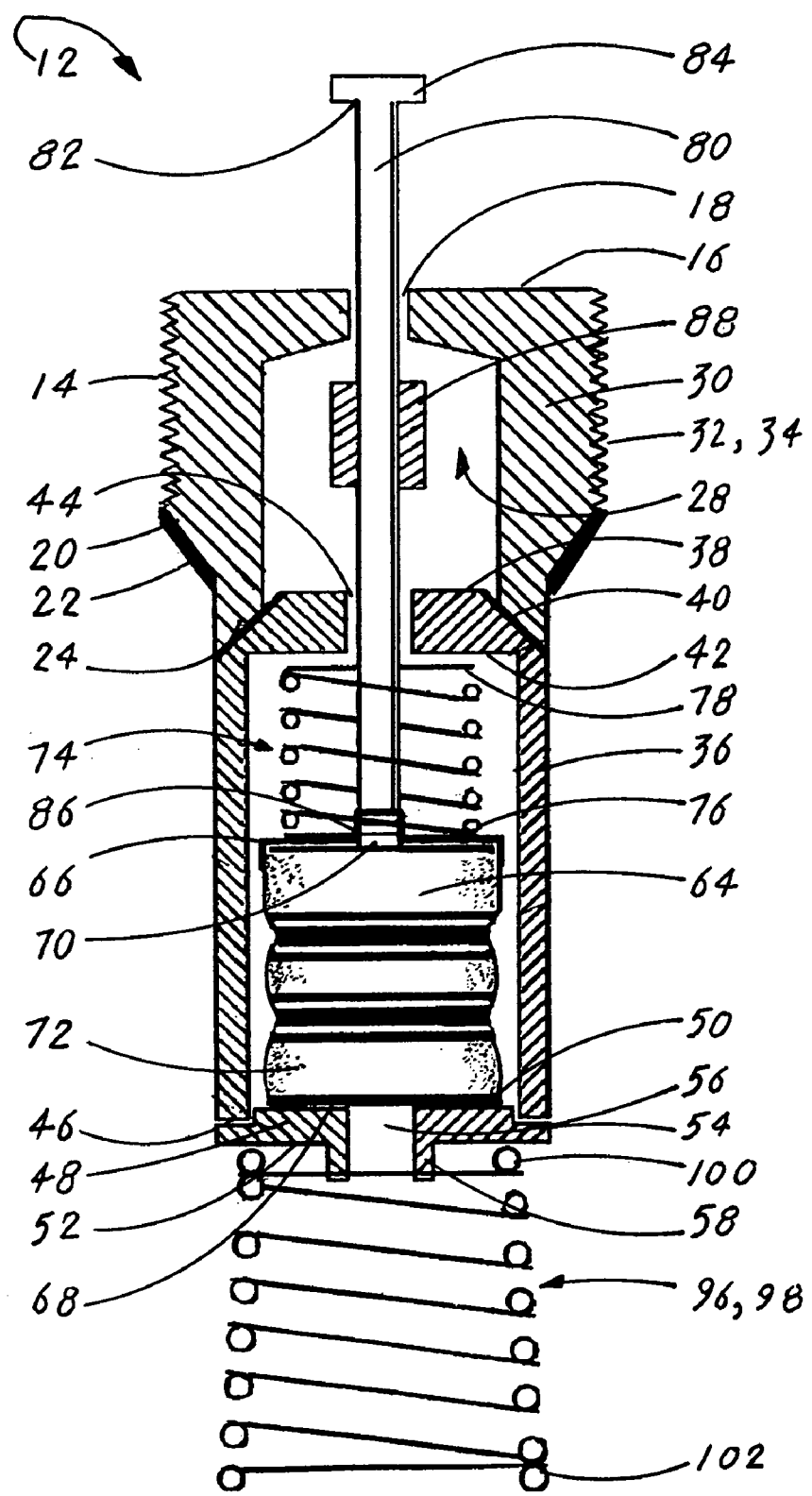
FIG. 1 is a cross-sectional elevational view of a valve core showing the relative locations of a valve plug, a plunger housing having internally located a diaphragm and an upper spring, and a lower spring.

The best mode for carrying out the invention is presented in terms of a preferred embodiment for a tire pressure indicator 10 (hereinafter "TPI 10"). The preferred embodiment of the TPI 10, as shown in FIGS. 14, 5A, 5B, 6A through 6C, and 7, is comprised of four major elements: a valve core 12, a control cap 106, a tire-pressure transmitting unit (TPTU) 150 and a tire-pressure monitoring unit (TPMU) 160.

The TPI 10 is designed to function in combination with a vehicle tire stem 170 that has had a conventional Schrader-type valve core removed. The valve tire stem 170 has an upper end 172 that includes a set of outer threads 174 and a lower end 176 that includes a spring retainer 178.

Figure 2:
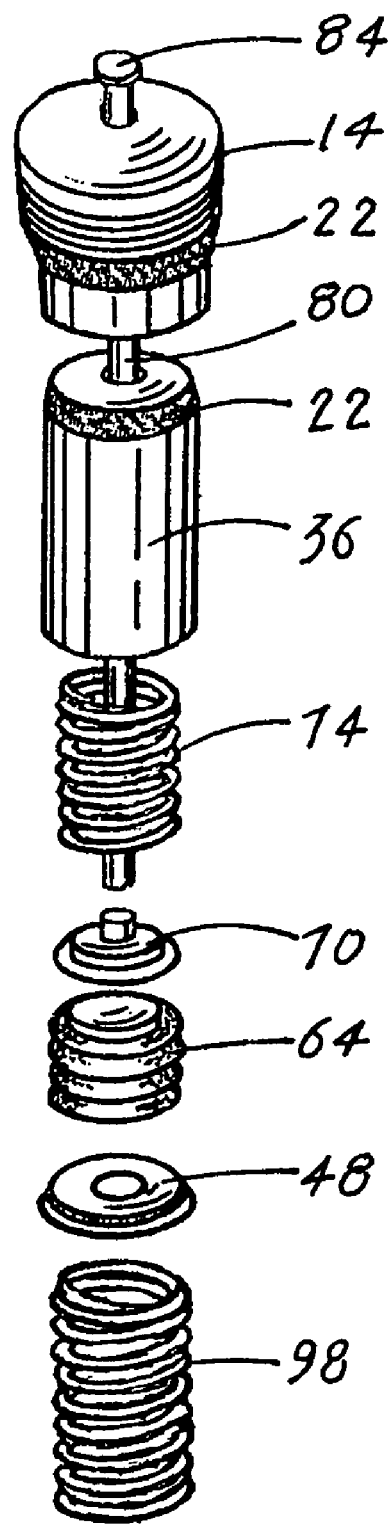
FIG. 2 is an exploded perspective view of the valve core.
Figure 3:
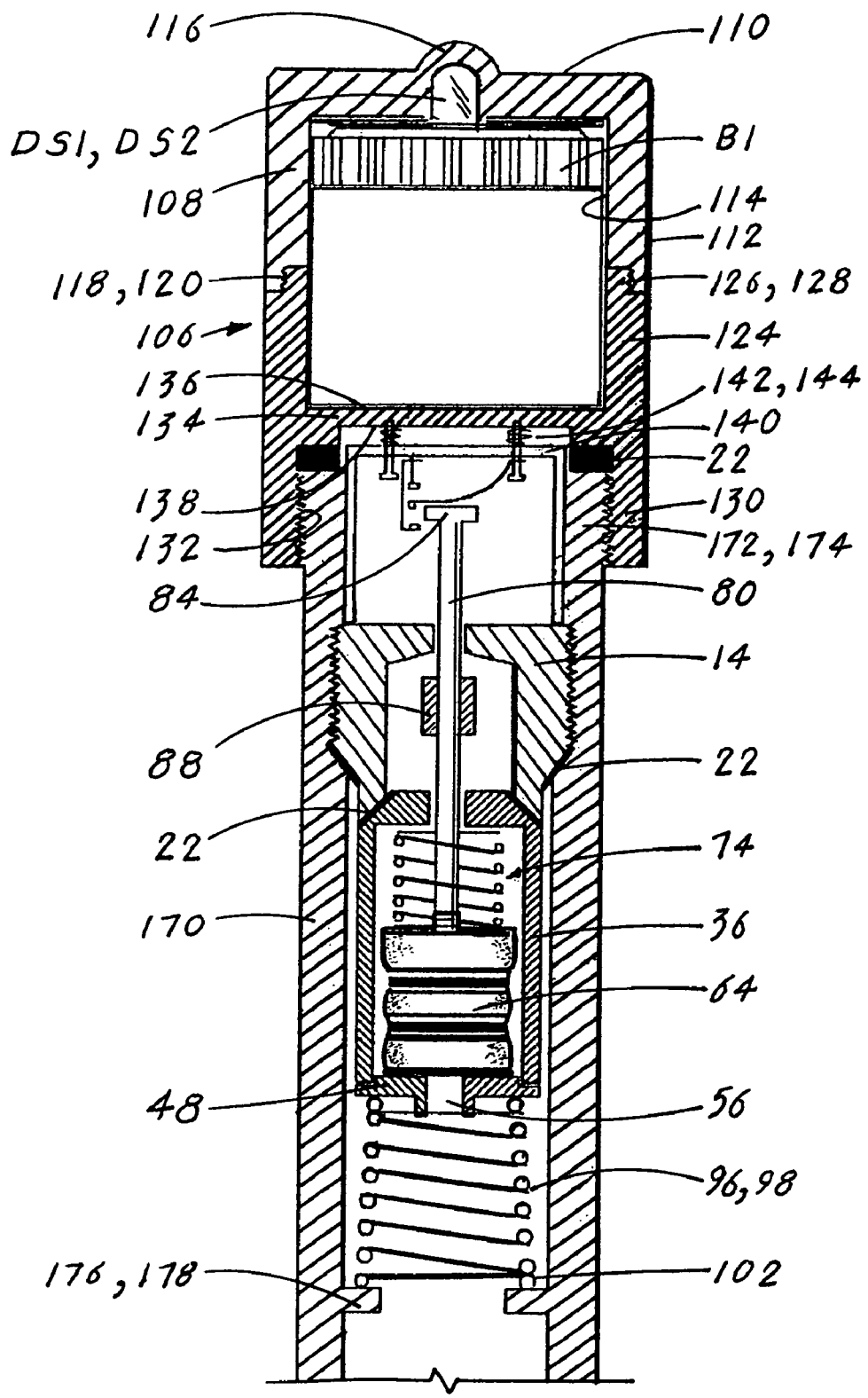
FIG. 3 is a cross-sectional elevational view of a tire pressure indicator (TPI) showing the valve core having attached a control cap and with the valve core inserted into a vehicle tire stem.
Figure 4:
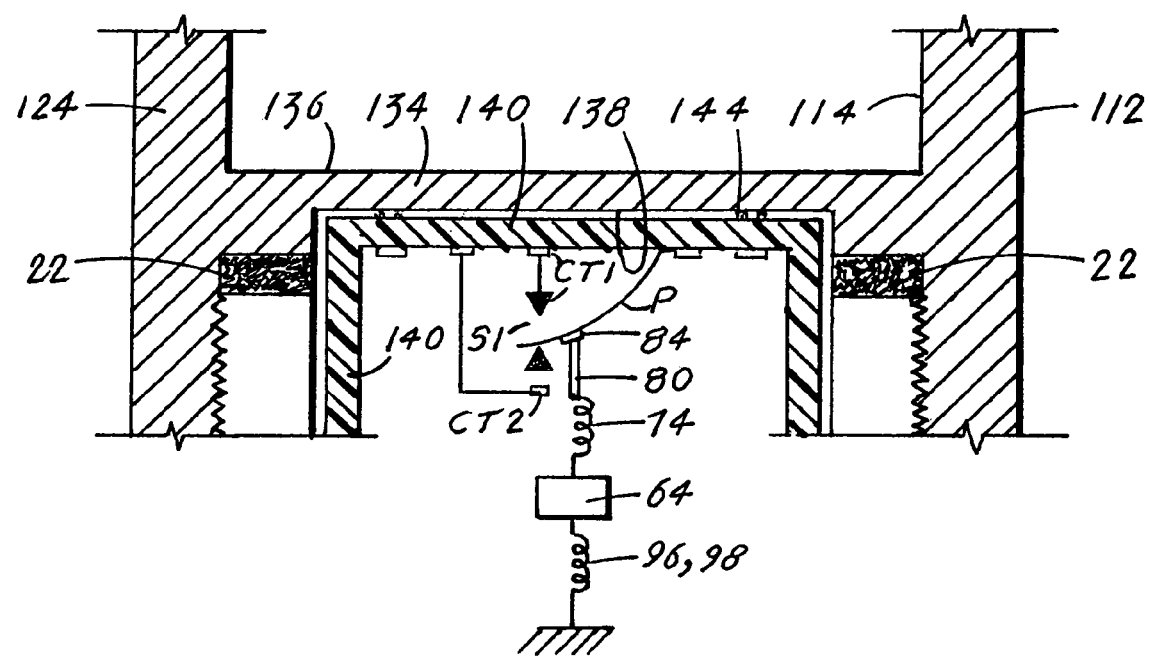
FIG. 4 is a partial enlarged view showing the mechanical attachment of a single-pole double-throw switch (S1) with a plunger shaft and the diaphragm.

The valve core 12, as shown in FIGS. 1 and 2, is designed to be inserted into and be attached to the vehicle tire stem 170, as shown in FIG. 3. The valve core 12 is comprised of a valve plug 14, a plunger housing 36 and a compressive element 96 that preferably consists of a lower spring 98, as shown in FIGS. 1 and 3. The spring 98 is selected to provide an adequate force to maintain a tight seal between the valve plug 14 and the plunger housing 36. The valve plug 14 is made of a material that is selected from the group consisting of brass, bronze, copper, aluminum or steel. The valve plug 14, as shown in FIG. 1, includes an upper surface 16 having therethrough a substantially centered plug shaft bore 18, a valve stem interfacing surface 20, a lower surface 24 that is preferably angled, an upward-extending cavity 28 that terminates at the plug shaft bore 18, and a side wall 30 having an outer surface 32 that has a set of cap threads 34. The threads 34 are dimensioned to be threaded into the set of outer threads 174 located on the vehicle tire stem 170. To assure a tight fit, a resilient seal 22 is placed between the valve stem interfacing surface 20 on the valve plug 14 and the vehicle tire stem 170.

The plunger housing 36, as also shown in FIGS. 1 and 2, is dimensioned to enclose a diaphragm 64 and an upper spring 74, and is comprised of an upper section 38 having an upper surface 40 that is preferably angled, and a lower surface 42. The angled upper surface 40 is dimensioned to interface with the angled lower surface 24 located on the valve plug 14. To provide a positive interface between the angled upper surface 40 and an angled lower surface 24, a resilient seal 22 is placed between the two surfaces 40,24. The upper section 38, as shown in FIG. 2, also has a plunger shaft bore 44 that is in alignment with the plug shaft bore 18 that is located on the valve plug 14. The plunger housing 36 terminates with a lower end 46 that interfaces with a housing base 48.

The housing base 48, as shown in FIG. 1, has an upper surface 50 and a lower surface 52. The upper surface 50 is dimensioned and includes an attachment means 54, for being attached to the lower end 46 of the plunger housing 36. The housing base 48 further has a substantially centered air-passage bore 56 that is bordered by a downward-extending spring retaining sleeve 58 that retains a compressive element 96 such as the spring 98.

The diaphragm 64 which is housed within the plunger housing 36 includes an upper surface 66 and a lower surface 68. The lower surface 68 interfaces with the upper surface 50 of the housing base 48. The upper surface 66 of the diaphragm 64 has a centered shaft attachment cap 70. The upper spring 74 includes a lower end 76 and an upper end 78. The lower end 76 interfaces with the upper surface 66 of the diaphragm 64. The upper end 78 interfaces with the lower surface 42 of the plunger housing upper section 38.

Extending through the plug shaft bore 18 and through the plunger shaft bore 44 is a plunger shaft 80, as shown in FIG. 1. The plunger shaft 80 has an upper end 82 that terminates with a shaft cap 84, and a lower end 86 that is dimensioned to be attached to the shaft attachment cap 70 located on the upper surface 66 of the diaphragm 64. To prevent the plunger shaft 80 from applying excessive force to the upper surface 66 of the diaphragm 64 a plunger shaft stop 88 is utilized. The shaft stop 88 has a stop bore 90 that is dimensioned to frictionally fit into the plunger shaft 80. Alternatively, once the vertical displacement of the shaft stop is determined, a set screw (not shown) can be utilized to attach the plunger shaft stop 88 to the plunger shaft 80.

The lower spring 98, as also shown in FIGS. 1 and 2, has an upper end 100 and a lower end 102. The upper end 100 interfaces with the lower surface 52 of the housing base 48 and is also placed around the air-passage bore 56. The lower end 102, as shown in FIG. 3, interfaces with a spring retainer 178 located on the lower end 176 of the vehicle tire stem 170.

The control cap 106, as shown in FIG. 3, is comprised of an upper housing 108 and a lower housing 124 and is assigned a unique identification character that corresponds to a particular vehicle tire. When the control cap 106 is attached to the vehicle tire stem 170 a waterproof hermetic seal is attained.

The upper housing 108 includes an upper surface 110, an outer side surface 112, an inner side surface 114 and a lower end 118. The upper surface 110 has a substantially centered upward-extending LED insertion cavity 116. The lower end 118 terminates with a first attachment surface 120.

The lower housing 124, as also shown in FIG. 3, is comprised of an upper end 126, a lower section 130 and a circuit attachment base 134. The upper end 126 terminates with a second attachment surface 128 that interfaces with the first attachment surface 120 located on the upper housing 108. The lower section 130 has a set of threads 132 that interface with the set for threads 174 located on the vehicle tire stem 170. The circuit attachment base 134 is integrally formed with the lower housing 124 and has an upper surface 136 and a lower surface 138.

Figure 5A:
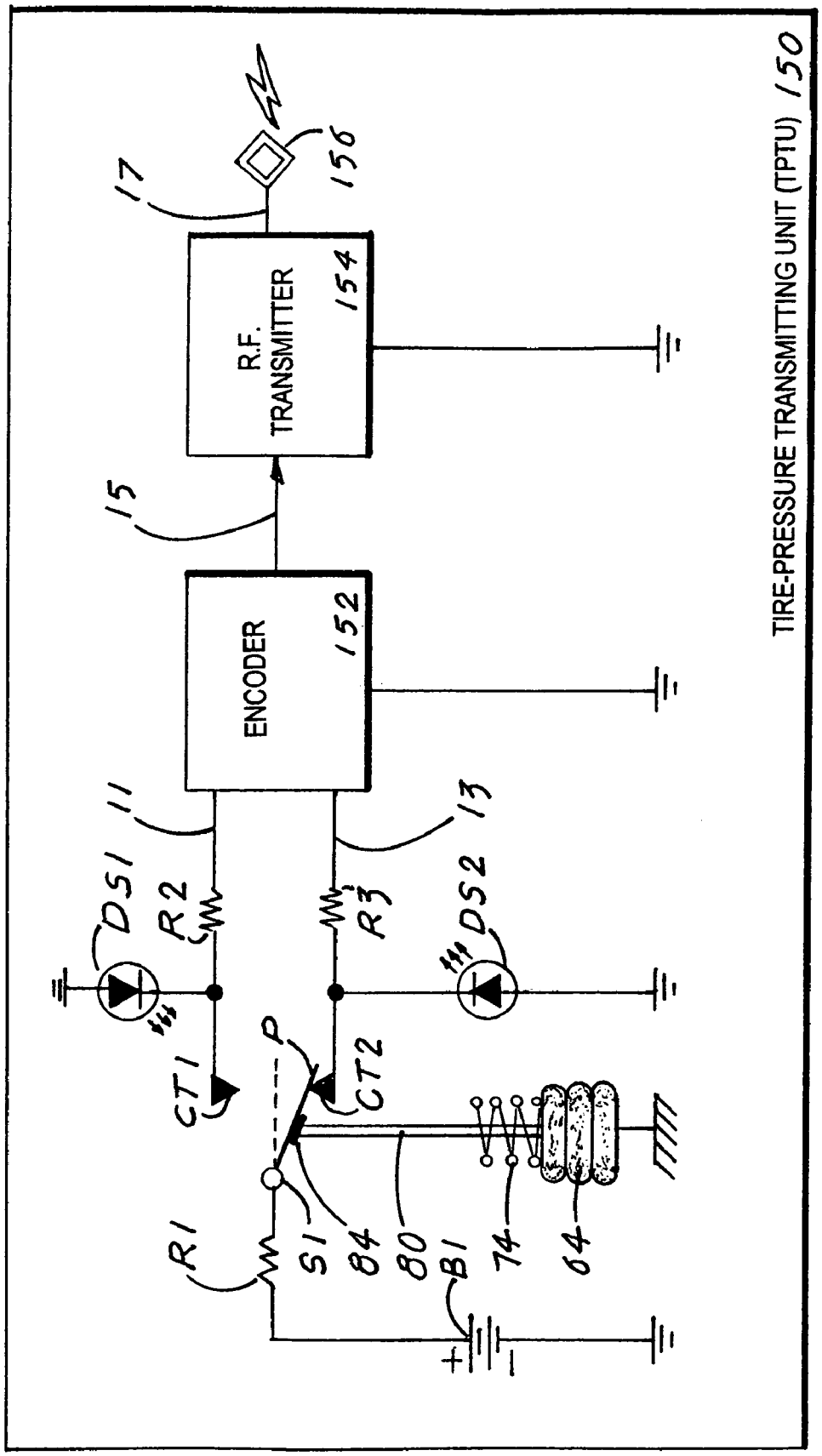
FIG. 5A is a combination block diagram and schematic diagram of the elements that comprise the tire-pressure transmitting unit (TPTU).

The tire-pressure transmitting unit (TPTU) 150 is enclosed within the control cap 106 and is shown in FIG. 5A. The TPTU 150 is comprised of the following major elements: a battery B1, a single-pole, double-throw switch S1, an encoder 152 and a radio frequency transmitter (R.F. transmitter) 154. The major elements of the TPTU 150 are attached to a circuit mounting structure 140 that is attached to the circuit attachment base 134, as shown in FIG. 3, by a set of screws 142. Inserted around the screws 142 and between the circuit mounting structure 140 and the circuit attachment base 134 is a shock-absorbing element 144 such as a spring 98.

The battery B1 has a positive terminal (+) and a negative terminal (−) that is connected to circuit ground. The single-pole, double-throw switch S1 has a pole P that is connected to the positive terminal (+) of the battery B1, a first contact CT1 from where is applied a high pressure signal 11, and a second contact CT2 from where is applied a low pressure signal 13. The contact position of the pole P is controlled by the vertical displacement of the plunger shaft 80. The pole P of the switch S1 is made of a conductive spring steel that is normally biased to interface with the low pressure contact CT2 of the switch S1. The pole P of the switch S1, is shown in FIG. 6A, a normal tire pressure position. In FIG. 6B, the pole P is shown in a low pressure position and in FIG. 6C the pole P is shown in a high pressure position.

The encoder 152 has means for receiving and processing the high pressure signal 11 or the low pressure signal 13. The encoder 152 produces an encoded output signal 15 corresponding to either the high pressure signal 11 or the low pressure signal 13.

The R.F. transmitter 154 has means for receiving and processing the encoded output signal 15 that is applied from the encoder 152 and producing and transmitting via a transmitting antenna 156, an encoded R.F. pressure signal 17 that corresponds to either the high pressure signal 11 or the low pressure signal 13.

The TPTU produces an encoded R.F. signal only when a tire pressure drops below 1.0 PSI or rises above 2.0 PSI as measured from the tire pressure recommended by the manufacturer of a vehicle.

The TPTU 150 is designed to prevent false high or low tire pressure signals that result from changes in the ambient temperature and/or normal tire temperature fluctuations that vary from a base temperature which corresponds to a preset tire pressure. The elimination of false tire-pressure signals is accomplished by making the plunger housing 36 or the plunger shaft 80 out of a temperature-sensitive material. The plunger housing 36 functions in combination with diaphragm 64 to prevent false tire-pressure readings as follows:

When the ambient temperature and/or the normal tire temperature fluctuations rise above the base temperature, the plunger housing 36 and the plunger base 48 moves downward. The rise in temperature also causes the pressure in the diaphragm 64 to increase which causes the lower section 72 of the diaphragm 64 and the housing base 48 to move downward an equal distance, while the upper surface 66 of the diaphragm 64 remains at its preset height. Since the plunger shaft 80 is attached to the upper surface 66 of the diaphragm 64, the plunger shaft 80 maintains the switch S1 at its original contact position.

When the ambient temperature and/or the normal tire temperature fluctuations fall below the base temperature, the plunger housing 36 and the plunger base 48 move upward. The drop in temperature also causes the pressure in the diaphragm 64 to decrease which causes the lower section 72 of the diaphragm 64 and the housing base 48 to move upward an equal distance, while the upper surface 66 of the diaphragm 64 remains at its preset height. Since the plunger shaft 80 is attached to the upper surface 66 of the diaphragm 64, the plunger shaft 80 maintains the switch S1 at its original contact position.

The TPTU 150, as shown in FIG. 5A, can also be designed to include an LED DS1 and an LED DS2.

The LED DS1 is inserted into the LED insertion cavity 116 that is located on the upper housing 108 of the control cap 106 and is connected across the high pressure signal 11 to circuit ground. The LED DS1 illuminates in a first color when the pole P of the switch S1 makes contact with the switch contact CT1 indicating a high pressure.

The LED DS2 is also inserted into the LED insertion cavity 116 that is connected across the lower pressure signal 13 to circuit ground. The LED DS2 illuminates in a second color when the pole P of the switch S1 makes contact with the switch contact CT2 indicating a low pressure. In lieu of using two LEDs, a single LED that can be illuminated in two colors can also be utilized.

Figure 5B:
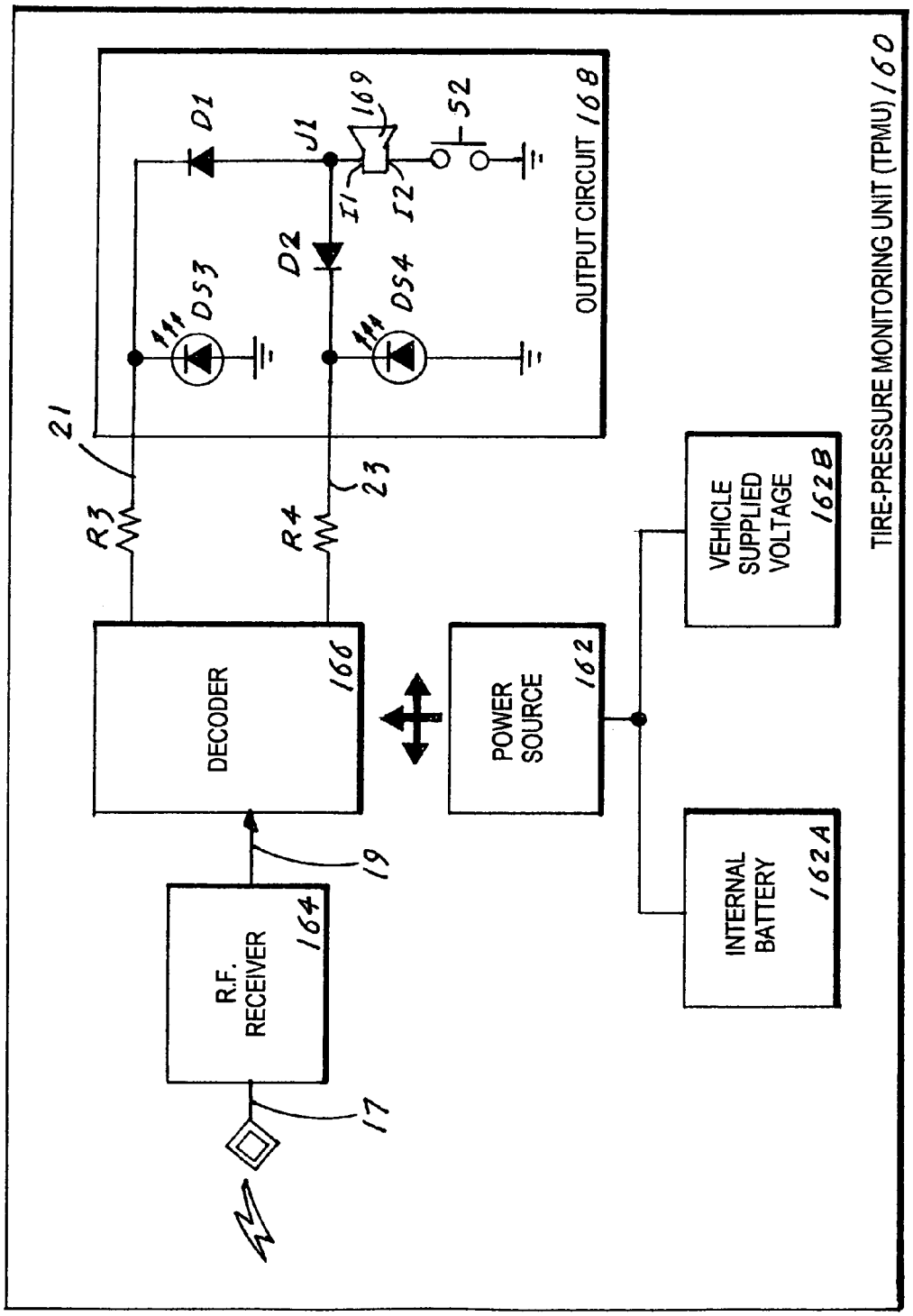
FIG. 5B is a combination block diagram and schematic diagram of the elements that comprise the tire-pressure monitoring unit (TPMU).

The tire-pressure monitoring unit (TPMU) 160 is located remotely from the TPTO. The TPMU, as shown in FIG. 5B, is comprised of the following major elements: a power source 162, an R.F. receiver 164, a decoder 166 and an output circuit 168.

The power source 162 is designed to supply the required power to operate the TPMU 160 and can be comprised of either an internal battery 162A or a vehicle supplied voltage 162B.

The R.F. receiver 164 has means for receiving and processing the encoded R.F. pressure signal 17 applied from the TPTU and producing an encoded high or low pressure signal 19.

The decoder 166 has means for receiving and processing the encoded high or low pressure signal 19 and producing either a decoded high pressure signal 21 or a decoded low pressure signal 23 that is applied to the output circuit 168.

The output circuit 168 is comprised of:

A high pressure indicting LED DS3 that is connected from the decoded high pressure signal 21 to circuit ground. The LED DS3 illuminates in a first color when the decoder produces the decoded high pressure signal 21.

A low pressure indicating LED DS4 that is connected from the decoded low pressure signal 23 to circuit ground. The LED DS4 illuminates in a second color when the decoder produces the decoded low pressure signal 23. The LEDs allow a user of the TPMU 160 to visually determine which tire is over or under inflated.

A first blocking diode D1 having its cathode connected in series with the decoded high pressure signal 21 and its anode connected to a junction J1.

A second blocking diode D2 having its cathode connected in series with the decoded low pressure signal 23 and its anode connected to the junction J1.

An audio device 169 having an input I1 connected to the junction J1 and an output 02 connected to circuit ground via an audio disabling switch S2. The audio device 169 provides a second means by which the user of the TPMU 160 can be alerted that there is a pressure problem with at least one of the tires.

To utilize the TPI 10 the following steps are performed:

a) Insert a valve core 12 into a vehicle tire stem 170.
b) Inflate a tire at a pressure that is recommended by the manufacturer of a vehicle,
c) Attach a control cap 106 to the vehicle tire stem 170:
  (1) If neither the high pressure LED DS1 or the low-pressure LED DS2 illuminate the tire-pressure is at the recommended tire pressure, as shown in FIG. 6A.
  (2) If the low-pressure LED DS2 illuminates, the tire pressure is low, as shown in FIG. 6B,
d) Remove the control cap 106, as shown in FIG. 7, and inflate the tire until the tire pressure is at the recommended pressure,
e) Attach the control cap 106 to the vehicle tire stem 170. Verify that the low pressure LED DS2 does not illuminate, indicating a normal tire pressure. If the high-pressure LED DS1 illuminates the tire pressure is high, as shown in FIG. 6C,
f) Remove the control cap 106, as shown in FIG. 7, and deflate the tire until the tire pressure is at the recommended tire pressure, and
g) Attach the control cap 106 to the vehicle tire stem 170. Verify that the high-pressure LED DS1 does not illuminate, indicating a normal tire pressure.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

Tire Pressure Indicator

Element Designation

For Convenience of the Examiner, not Part of the Specification

| | |
|---|---|
| 10 | Tire Pressure Indicator (TPI) |
| 12 | Valve Core |
| 14 | Valve Plug |
| 16 | Upper Surface |
| 18 | Plug Shaft Bore |
| 20 | Valve Stem Interfacing Surface |
| 22 | Resilient Seal |
| 24 | Angled Lower Surface |
| 26 | |
| 28 | Upward-Extending Cavity |
| 30 | Side Wall |
| 32 | Outer Surface |
| 34 | Cap Threads |
| 36 | Plunger Housing |
| 38 | Upper Section |
| 40 | Angled Upper Surface |
| 42 | Lower Surface |
| 44 | Plunger Shaft Bore |
| 46 | Lower End |
| 48 | Housing Base |
| 50 | Upper Surface |
| 52 | Lower Surface |
| 54 | Attachment Means |
| 56 | Air Passage Bore |
| 58 | Spring Retaining Sleeve |
| 60 | |
| 62 | |
| 64 | Diaphragm |
| 66 | Upper Surface |
| 68 | Lower Surface |

-continued

| | | |
|---|---|---|
| 70 | Shaft Attachment Cap | |
| 72 | Lower Section | |
| 74 | Upper Spring | |
| 76 | Lower End | |
| 78 | Upper End | |
| 80 | Plunger Shaft | |
| 82 | Upper End | |
| 84 | Shaft Cap | |
| 86 | Lower End | |
| 88 | Shaft Stop | |
| 90 | Stop Bore | |
| 92 | | |
| 94 | | |
| 96 | Compressive Element | |
| 98 | Spring | |
| 100 | Upper End | |
| 102 | Lower End | |
| 104 | | |
| 106 | Control Cap | |
| 108 | Upper Housing | |
| 110 | Upper Surface | |
| 112 | Outer Side Surface | |
| 114 | Inner Side Surface | |
| 116 | LED Insertion Cavity | |
| 118 | Lower End | |
| 120 | First Attachment Surface | |
| 122 | | |
| 124 | Lower Housing | |
| 126 | Upper End | |
| 128 | Second Attachment Surface | |
| 130 | Lower Section | |
| 132 | Threads | |
| 134 | Circuit Attachment Base | |
| 136 | Upper Surface | |
| 138 | Lower Surface | |
| 140 | Circuit Mounting Structure | |
| 142 | Screw | |
| 144 | Shock Absorbing Element | |
| 146 | | |
| 148 | | |
| 150 | Tire-Pressure Transmitting Unit (TPTU) | |
| 152 | Encoder | |
| 154 | R.F. Transmitter | |
| 156 | Transmitting Antenna | |
| 158 | | |
| 160 | Tire-Pressure Monitoring Unit (TPMU) | |
| 162 | Power Source | |
| 162A | Internal Battery | |
| 162B | Vehicle Supplied Voltage | |
| 164 | R.F. Receiver | |
| 166 | Decoder | |
| 168 | Output Circuit | |
| 169 | Audio Device | |
| 170 | Vehicle Tire Stem | |
| 172 | Upper End | |
| 174 | Threads | |
| 176 | Lower End | |
| 178 | Spring Retainer | |
| SIGNALS | | |
| 11 | High Pressure Signal | |
| 13 | Low Pressure Signal | |
| 15 | Encoded Output Signal | |
| 17 | Encoded R.F. Pressure Signal | |
| 19 | High or Low Pressure Signal | |
| 21 | Decoded High Pressure Signal | |
| 23 | Decoded Low Pressure Signal | |
| B1 | Battery | |
| S1 | SPDT Switch | |
| S2 | SPST Switch | |
| P | Pole | |
| CT1 | First Contact (HI) | |
| CT2 | Second Contact (LO) | |

The invention claimed is:

1. A tire pressure indicator (TPI) that functions in combination with a vehicle tire stem that has a conventional Schrader-type tire-valve core removed and that has an upper end that includes a set of outer threads and a lower end that includes a spring retainer, said TPI comprising:

A. a valve core that is designed to be inserted into the vacated vehicle tire stem, said valve core comprising:

a) a valve plug having an upward-extending cavity that terminates with an upper surface having a plug shaft bore, a valve stem interfacing surface and a lower surface, b) a plunger housing having:
   (1) an upper surface that interfaces with the lower surface of said valve plug and a plunger shaft bore that is in alignment with the plug shaft bore,
   (2) a lower surface having attached thereto a housing base having an upper surface, a lower surface, and an air-passage bore, c) a diaphragm located within said plunger housing and having an upper surface and a lower surface wherein the lower surface interfaces with the upper surface of the housing base, d) an upper spring that is located between the upper surface of said diaphragm and the upper surface of said plunger housing, e) a plunger shaft that extends through the plug shaft bore and through the plunger shaft bore, wherein said plunger shaft having an upper end and a lower end that interfaces with the upper surface of said diaphragm, f) a compressive element located between the lower surface of the base and the spring retainer on the vehicle tire stem, B. a control cap that interfaces with the valve plug and that attaches to the upper end of the vehicle valve stem, C. a tire-pressure transmitting unit (TPTU) that is enclosed within said control cap, said TPTU having means for receiving and processing a high pressure signal and a low pressure signal, and producing and transmitting an encoded R.F. signal that corresponds to either an encoded high pressure signal or an encoded low pressure signal, D. a tire-pressure monitoring unit (TPMU) that is located remotely from said TPTU, said TPMU having means for receiving and processing the encoded R.F. signal from said TPTU and means for producing:
   a) a decoded high pressure signal that illuminates an LED (DS3) in a first color, or
   b) a decoded low pressure signal that illuminates an LED (DS4) in a second color, and E. means for preventing said TPTU from transmitting false high or low tire pressure signals that result from changes in the ambient temperature and/or normal tire temperature fluctuations that vary from a base temperature that corresponds to a preset tire pressure.

2. The tire pressure indicator as specified in claim 1 wherein the lower end of said plunger shaft is permanently attached to the upper surface of said diaphragm.

3. The tire pressure indicator as specified in claim 1 wherein the lower surface of said plunger housing further having a downward-extending sleeve that surrounds the air passage bore and that functions as a lower spring retainer.

4. The tire pressure indicator as specified in claim 1 further comprising:

a) a resilient seal that is placed between the valve stem interfacing surface on the valve plug and the vehicle valve stem, and b) a resilient seal that is placed between the lower surface of the valve plug and the upper surface of the plunger sleeve.

5. The tire pressure indicator as specified on claim 1 further comprising a shaft stop that is positioned on said plunger shaft to prevent the plunger shaft from applying an excessive force to the upper surface of said diaphragm.

6. The tire pressure indicator as specified in claim 1 wherein said means for producing and transmitting an encoded R.F. signal is provided by said TPTU that further comprises:
   a) a battery (B1) having a positive terminal (+) and a negative terminal (−) that is connected to circuit ground,
   b) a single-pole, double-throw switch (S1) having a pole (P) that is connected to the positive terminal of the battery (B1), a first contact (CT1) from where is applied a high pressure signal (11) and a second contact (CT2) from where is applied a low pressure signal (13), wherein the contact position of the pole (P) is controlled by the vertical displacement of the plunger shaft,
   c) an encoder (152) having means for receiving and processing the high pressure signal (11) and the low pressure signal (13), wherein the encoder (152) produces an encoded output signal (15) that consists of either an encoded high pressure signal or an encoded low pressure signal, and
   d) an R.F. transmitter (154) having means for receiving and processing the encoded output signal (15) applied from the encoder (152) and producing and transmitting, via a transmitting antenna (156), an encoded R.F. signal (17) that corresponds to either the encoded high pressure signal (11) or the encoded low pressure signal (13).

7. The tire pressure indicator as specified in claim 6 wherein said means for receiving and processing the encoded high pressure signal or the encoded low pressure signal is provided by said TPMU that further comprises:
   a) a power source that is designed to supply the required power to operate said TPMU, wherein the power source is comprised of either an internal battery or a vehicle supplied voltage source,
   b) a R.F. receiver (164) having means for receiving and processing the encoded R.F. pressure signal (17) applied from said TPTU and producing an encoded high or low pressure signal (19),
   c) a decoder having means for receiving and processing the high or low pressure signal (19) and producing either a decoded high pressure signal (21) or a decoded low pressure signal (23),
   d) an output circuit (166) comprising:
      (1) a high pressure indicting LED (DS3) that is connected from the decoded high pressure signal (21) to circuit ground, wherein the LED (DS3) illuminates in a first color when the decoder produces the decoded high pressure signal (21),
      (2) a lower pressure indicating LED (DS4) that is connected from the decoded low pressure signal (23) to circuit ground, wherein the LED (DS4) illuminates in a second color when the decoder produces the decoded low pressure signal (23),
      (3) a first blocking diode (D1) having its cathode connected in series with the decoded high pressure signal (21) and its anode connected to a junction (J1),
      (4) a second blocking diode (D2) having its cathode connected in series with the decoded low pressure signal (23) and its anode connected to the junction (J1),
      (5) an audio device having an input (I1) connected to the junction (J1) and an output (O2) connected to circuit ground via an audio disabling switch (S2).

8. The tire pressure indictor as specified in claim 1 wherein said means for preventing said TPTU from transmitting false high and low tire pressure signals comprises a plunger housing or a plunger shaft that is made of a temperature-sensitive material, wherein:
   a) when the ambient temperature and/or the normal tire temperature fluctuations rise above the base temperature, said plunger housing and the plunger base move downward, wherein the rise in temperature also causes the pressure in said diaphragm to increase, which causes the lower section of said diaphragm and the housing base to both move downward an equal distance, while the upper surface of said diaphragm remains at its preset height, since said plunger shaft is attached to the upper surface of said diaphragm, the plunger shaft maintains the switch (S1) at its original contact position, and
   b) when the ambient temperature and/or the normal tire temperature fluctuations fall below the base temperature, said plunger housing and the plunger base move upward, wherein the drop in temperature also causes the pressure in said diaphragm to decrease which causes the lower section of said diaphragm and the housing base to both move upward an equal distance, while the upper surface of the said diaphragm remains at its preset height, since the plunger shaft is attached to the upper surface of said diaphragm, the plunger shaft maintains the switch (S1) at its original contact position.

9. A tire pressure indicator (TPI) that functions in combination with a vehicle tire stem that has a conventional Schrader-type tire-valve core removed and that has an upper end that includes a set of outer threads and a lower end that includes a spring retainer, said TPI comprising:
   A. a valve core that is designed to be inserted into and attached to the vehicle tire stem, said valve core comprising:
      a) a valve plug having:
         (1) an upper surface having therethrough a substantially centered plug shaft bore,
         (2) a valve stem interfacing surface,
         (3) an angled lower surface,
         (4) an upward-extending cavity that terminates at the plug shaft bore, and
         (5) a side wall having an outer surface that has a set of cap threads which are dimensioned to be threaded into the outer threads on the vehicle tire stem,
      b) a plunger housing having:
         (1) an upper section having an angled upper surface and a lower surface, wherein the angled upper surface is dimensioned to interface with the angled lower surface located on said valve plug, with the upper section further having a plunger shaft bore that is in alignment with the plug shaft bore,
         (2) a lower surface,
         (3) a housing base having an upper surface and a lower surface, wherein the upper surface is dimensioned and has an attachment means for being attached to the lower surface of the plunger housing, with the housing base further having a substantially centered air-passage bore that is bordered by a downward-extending spring retaining sleeve,
      c) a diaphragm located within said plunger housing and having an upper surface and a lower surface, wherein the lower surface interfaces with the upper surface of the housing base and the upper surface has a substantially centered shaft attachment cap,
      d) an upper spring having an lower end and an upper end, wherein the lower end interfaces with the upper surface of the diaphragm and the upper end interfaces with the lower surface of said plunger housing upper section,
e) a plunger shaft that extends through the plug shaft bore and through the plunger shaft bore, wherein the shaft has an upper end that terminates with a shaft cap and a lower end that is dimensioned to be attached to the shaft attachment cap located on the upper surface of said diaphragm,
f) a plunger shaft stop having a stop bore that is inserted into the plunger shaft and that is located within the cavity of said valve plug, wherein the shaft stop is positioned on said plunger shaft to prevent the plunger shaft from applying excessive force to the upper surface of said diaphragm,
g) a lower spring having an upper end and a lower end, wherein the upper end interfaces with the lower surface of the housing base and is also placed around the air-passage bore, and the lower end interfaces with a spring retainer located on the lower end of the vehicle tire stem, wherein said spring is selected to provide an adequate force to maintain a tight seal between said valve plug and said plunger housing, B. a control cap comprising:
  a) an upper housing having:
    (1) an upper surface, an outer side surface and an inner side surface, with the upper surface having a substantially centered upward-extending LED insertion cavity, and
    (2) a lower end that terminates with a first attachment surface,
  b) a lower housing having:
    (1) an upper end that terminates with a second attachment surface that interfaces with the first attachment surface on the upper housing,
    (2) a lower section having a set of threads that interface with the set of threads located on the vehicle tire stem, and
    (3) a substantially centered circuit attachment base having an upper surface and a lower surface, wherein when said control cap is attached to the vehicle valve stem a waterproof hermetic seal is attained, C. a tire-pressure transmitting unit (TPTU) that is enclosed within said control cap, wherein said TPTU comprises:
  a) a battery (B1) having a positive terminal (+) and a negative terminal (−) that is connected to circuit ground,
  b) a single-pole, double-throw switch (S1) having a pole (P) that is connected to the positive terminal of the battery (B1), a first contact (CT1) from where is applied a high pressure signal (11) and a second contact (CT2) from where is applied a low pressure signal (13), wherein the contact position of the pole (P) is controlled by the vertical displacement of the plunger shaft,
  c) an encoder (152) having means for receiving and processing the high pressure signal (11) or the low pressure signal (13), wherein the encoder (152) produces an encoded output signal (15) corresponding to either the high pressure signal (11) or the low pressure signal (13),
  d) an R.F. transmitter (154) having means for receiving and processing the encoded output signal (15) applied from the encoder (152) and producing and transmitting via a transmitting antenna (156), an encoded R.F. pressure signal (17) that corresponds to either the high pressure signal (11) or the low pressure signal (13), D. a tire-pressure monitoring unit (TPMU) that is located remotely from said TPTO, wherein said TPMU comprises:
  a) a power source (162) that is designed to supply the required power to operate said TPMU, wherein the power source (162) is comprised of either an internal battery (162A) or a vehicle supplied voltage (162B),
  b) a R.F. receiver (164) having means for receiving and processing the encoded R.F. pressure signal (17) applied from said TPTU and producing an encoded high or low pressure signal (19),
  c) a decoder (166) having means for receiving and processing the encoded high or low pressure signal (19) and producing either a decoded high pressure signal (21) or a decoded low pressure signal (23),
  d) an output circuit (168) comprising:
    (1) a high pressure indicting LED (DS3) that is connected from the decoded high pressure signal (21) to circuit ground, wherein the LED (DS3) illuminates in a first color when the decoder produces the decoded high pressure signal (21),
    (2) a lower pressure indicating LED (DS4) that is connected from the decoded low pressure signal (23) to circuit ground, wherein the LED (DS4) illuminates in a second color when the decoder produces the decoded low pressure signal (23),
    (3) a first blocking diode (D1) having its cathode connected in series with the decoded high pressure signal (21) and its anode connected to a junction (J1),
    (4) a second blocking diode (D2) having its cathode connected in series with the decoded low pressure signal (23) and its anode connected to the junction (J1),
    (5) an audio device (169) having an input (I1) connected to the junction (J1) and an output (02) connected to circuit ground via an audio disabling switch (S2), and E. means for preventing said TPTU from transmitting false high or low tire pressure signals that result from changes in the ambient temperature and/or normal tire temperature fluctuations that vary from a base temperature which corresponds to a preset tire pressure.

10. The tire pressure indicator as specified in claim 9 wherein the valve plug is made of a material that is selected from the group consisting of brass, bronze, copper, aluminum and steel.

11. The tire pressure indicator as specified in claim 9 wherein said means for preventing said TPTU from transmitting false pressure signals comprises a plunger housing or a plunger shaft made of a temperature-sensitive material, wherein:
  a) when the ambient temperature and/or the normal tire temperature fluctuations rise above the base temperature, said plunger housing and the plunger base move downward, wherein the rise in temperature also causes the pressure in said diaphragm to increase, which causes the lower section of said diaphragm and the housing base to both move downward an equal distance, while the upper surface of said diaphragm remains at its preset height, since said plunger shaft is attached to the upper surface of said diaphragm, the plunger shaft maintains the switch (S1) at its original contact position, and
  b) when the ambient temperature and/or the normal tire temperature fluctuations fall below the base temperature, said plunger housing and the plunger base move upward, wherein the drop in temperature also causes the pressure in said diaphragm to decrease which causes the lower section of said diaphragm and the housing base to both move upward an equal distance, while the upper surface of the said diaphragm remains at its preset height, since the plunger shaft is attached to the upper surface of said diaphragm, the plunger shaft maintains the switch (S1) at its original contact position.

12. The tire pressure indicator as specified in claim 9 further comprising a resilient seal that is placed between the valve stem interfacing surface on the valve plug and the vehicle tire stem.

13. The tire pressure indicator as specified in claim 12 further comprising a resilient seal that is placed between the lower surface of the valve plug and the upper surface of the plunger housing.

14. The tire pressure indicator as specified in claim 9 wherein the control cap is assigned a unique identification character that corresponds to a particular vehicle tire.

15. The tire pressure indicator as specified in claim 9 wherein said TPTU produces an encoded R.F. signal when a tire pressure drops below 1.0 PSI or rises above 2.0 PSI as measured from the tire pressure recommended by the tire manufacturer.

16. The tire pressure indicator as specified in claim 9 wherein the major elements that comprise the TPMU are located on a circuit mounting structure that is attached by means of screws to the lower surface of the circuit attachment base that is located on the lower section of said control cap.

17. The tire pressure indicator as specified in claim 16 further comprising a shock-absorbing element that is inserted around the screws and between the circuit attachment structure and the circuit attachment base.

18. The tire pressure indicator as specified in claim 9 wherein the pole of the switch (S1) is made of a conductive spring steel that is normally spring biased to interface with the lower pressure contact of the switch (S1).

19. The tire pressure indicator as specified in claim 9 wherein said TPTU further comprises:
   a) an LED (DS1) that is inserted into the LED cavity located on the upper housing of the control cap, and that is connected across the high pressure signal (11) to circuit ground, wherein the LED (DS1) illuminates in a first color when the pole (P) of the switch (S1) makes contact with the switch contact (CT1) indicating a high pressure, and
   b) an LED (DS2) that is also inserted into the LED cavity, and that is connected across the lower pressure signal (13) to circuit ground, wherein the LED (DS2) illuminates in a second color when the pole (P) of the switch (S1) makes contact with the switch contact (CT2).

20. A process for utilizing said tire pressure indicator comprising the following steps:
   a) Insert a valve core into a vehicle tire stem,
   b) Inflate a tire at a pressure that is recommended by the manufacturer of a vehicle,
   c) Attach a control cap to the vehicle tire stem, wherein:
     (1) If neither the high pressure LED (DS1) or the low-pressure LED (DS2) illuminate the tire-pressure is at the recommended tire pressure,
     (2) If the low-pressure LED (DS2) illuminates, the tire pressure is low,
   d) Remove said control cap, and inflate the tire until the tire pressure is at the recommended tire pressure,
   e) Attach said control cap to the vehicle tire stem, verify that the low pressure LED (DS2) does not illuminate, indicating a normal tire pressure, wherein if the high-pressure LED (DS1) illuminates the tire pressure is high,
   f) Remove said control cap, and deflate the tire until the tire pressure is at the recommended tire pressure, and
   g) Attach said control cap to the vehicle tire stem, verify that the high-pressure LED (DS1) does not illuminate, indicating a normal tire pressure.

* * * * *